United States Patent [19]
Chezzi

[11] Patent Number: 5,157,980
[45] Date of Patent: Oct. 27, 1992

[54] PROPULSION DEVICE FOR POWER MACHINES OR TOOLS OPERATING ALONG CONTINUOUS FLOW PRODUCTION LINES

[75] Inventor: Aleardo Chezzi, Boretto, Italy

[73] Assignee: Oto Mills S.p.A., Boretto, Italy

[21] Appl. No.: 749,565

[22] Filed: Aug. 26, 1991

Related U.S. Application Data

[63] Continuation-in-part of Ser. No. 425,816, Oct. 23, 1989, abandoned.

[30] Foreign Application Priority Data

May 17, 1989 [IT] Italy .................. 40081 A/89

[51] Int. Cl.$^5$ .................. F16H 21/16; F16H 7/14
[52] U.S. Cl. .................. 74/89.22; 74/501.5 H; 198/341; 198/813; 474/114
[58] Field of Search .................. 74/89.2, 89.21, 89.22, 74/501.5 R, 501.5 H; 474/110, 113, 114; 198/341, 813; 901/7

[56] References Cited

U.S. PATENT DOCUMENTS

| | | | |
|---|---|---|---|
| 683,968 | 10/1901 | Moskowitz | 474/113 X |
| 2,666,863 | 1/1954 | Davis et al. | 474/114 X |
| 2,788,883 | 4/1957 | Schwenk | 198/813 |
| 3,283,918 | 11/1966 | Devol | 198/341 X |
| 3,568,569 | 3/1971 | Haley | 198/813 X |
| 3,659,468 | 5/1972 | Alford et al. | 74/89.22 |
| 4,291,630 | 9/1981 | Fort | 74/89.22 X |
| 4,561,624 | 12/1985 | Freeman | 474/114 X |
| 4,566,346 | 1/1986 | Petiteau | 74/89.22 |
| 4,893,661 | 1/1990 | Onsrud | 474/114 X |

*Primary Examiner*—Allan D. Herrmann
*Attorney, Agent, or Firm*—Dvorak and Traub

[57] ABSTRACT

In a propulsion device for power machines operating in conjunction with production lines carrying an uninterrupted stream of semi-finished iron or steel products, the machine or tool (5) forms a part of a guided mobile assembly (3) capable of traversing back and forth parallel to the production line (4) and set in motion by at least one wire rope (8) to which it is firmly anchored. The rope (8) is wound around and tensioned between two pulleys or drums (9, 10) of which at least one is power driven.

2 Claims, 3 Drawing Sheets

PROPULSION DEVICE FOR POWER MACHINES OR TOOLS OPERATING ALONG CONTINUOUS FLOW PRODUCTION LINES

This is a Continuation-In-Part of application Ser. No. 07/425,816, filed Oct. 23, 1989, now abandoned.

BACKGROUND OF THE INVENTION

The invention relates to a propulsion device for power machines or tools stationed along continuous flow machines production lines, in particular as adopted in the manufacture of iron and steel products, such as rolled bars. Such devices serve specifically, though by no means exclusively, to generate the following movement of 'flying' machines units or equipment used to effect operations such as shearing, cross-cutting and punching, etc., on part-machined work generally, which cannot be allowed to remain stationary in a fixed position due to its very nature or shape, or to the operating requirements of production media installed up-line, but must be kept moving steadily forward (generally along a straight path). Devices of the type in question operate to a set cycle that must be completed normally within a significantly short space of time, and will include a succession of essential steps: 1) hard acceleration, serving to take the machine or equipment at high speed from a stationary at-rest position up to a velocity approaching that of the work moving along the line; 2) stabilization and alignment, whereby the machine or equipment gains a velocity identical to that of the line and the tool is positioned accurately in readiness to operate; 3) operation of the machine or equipment proper, following the moving line at identical velocity for as long as is necessary to effect the machining stroke and retract the tool; 4) hard deceleration, whereby the machine is slowed up to a complete standstill at the installed travel limit; 5) return of the machine or equipment to the original at-rest position in readiness for the next cycle.

The implemention of a cycle as outlined above in steel production, and in metallurgical processes generally, involves a number of problems of which most are connected with the particular features and hostile nature of the operating environment. Prior art methods have failed thus far to provide a satisfactory response to these problems. For example, conventional propulsion devices which utilize clutch-brake mechanisms combine positive features such as accuracy in synchronization, i.e. obtaining identical velocity of the tool and the work, with negative factors such as poor alignment and heavy wear, which severely jeopardizes the dependability of the clutch and brake assemblies. Other conventional propulsion devices utilize fluid power, hydraulic or pneumatic. Whilst the actuator is essentially simple in such devices (an ordinary cylinder), synchronization between the velocities of tool and work nonetheless require complicated mechanisms, and the fluid control systems tend to be low on dependability due to the hostility of the operating environment.

Similarly, the prior art embraces electromechanical systems utilizing a geared electric motor coupled to a rack-and-pinion type drive, which apparently possess all the features necessary for faultless implementation of the propulsion cycle in question (fine adjustment of drive parameters, good levels of machining accuracy, good general flexibility), though in practice, serious limitations are found to exist precisely in iron and steel manufacture; more exactly, the rack-and-pinion drive, essential to ensuring a rigid connection between the geared motor and the moving assembly, becomes subject to early wear as a result of operating in environments that are heavily laden with oxides, calamines and swarf.

Limitations of an even more serious nature are encountered with chain-driven propulsion devices; such devices are in fact unable to accommodate sharp acceleration and deceleration, and prone to elongation, the damaging consequence of which is to jeopardize correct synchronization of the tool and work velocities as described above. Accordingly, the object of the present invention is to overcome the various drawbacks and shortcomings of the prior art as described above.

SUMMARY OF THE INVENTION

The stated object is realized with a propulsion device that permits of controlling movement and accuracy parameters, and at the same time, of eliminating almost all those problems connected with mechanical parts wear that are attributable to hostile operating environments, by the adoption of a progressively tensionable drive transmission utilizing wire ropes.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
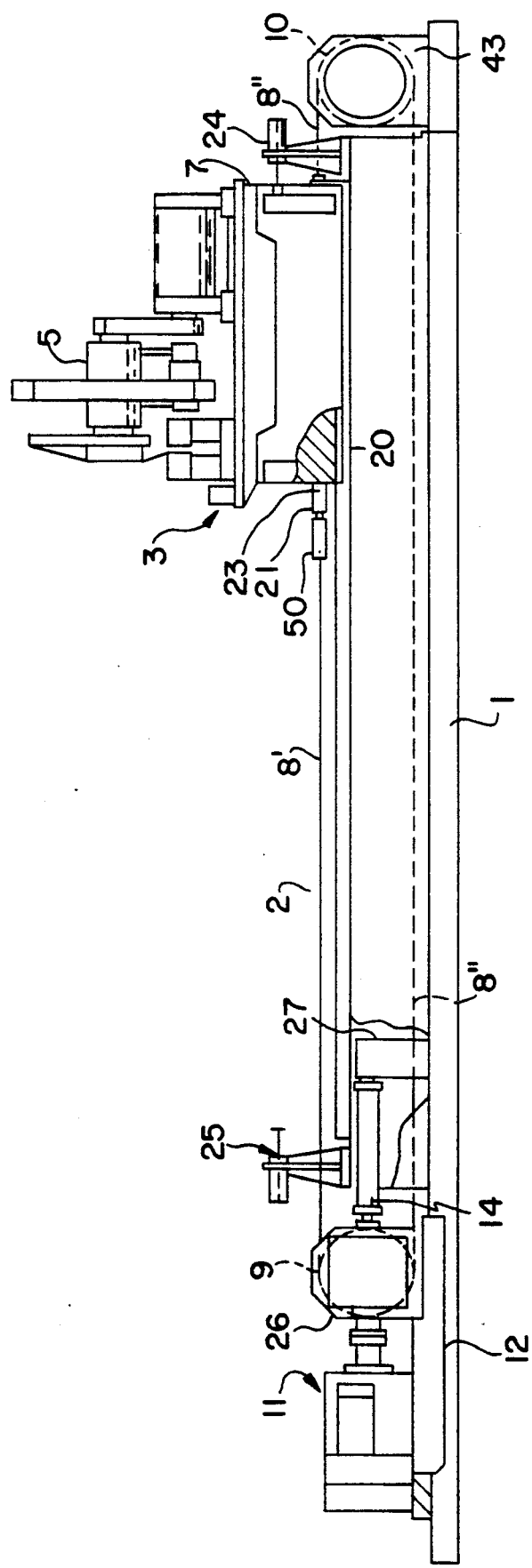
FIG. 1 is a schematic frontal view of the device seen in vertical elevation.
Figure 2:
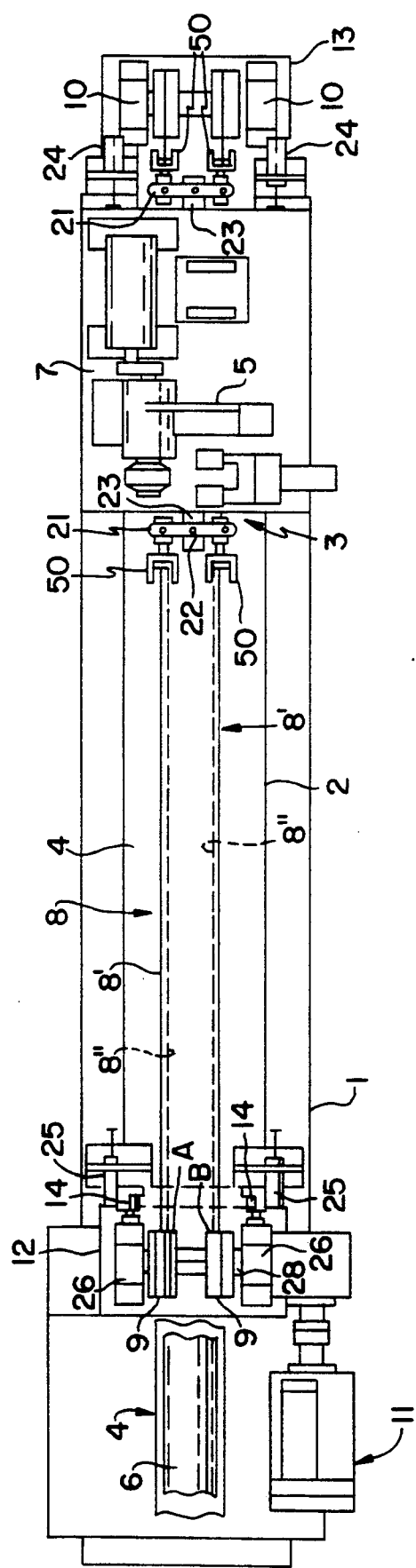
FIG. 2 is the plan of FIG. 1, viewed from above.
Figure 3:
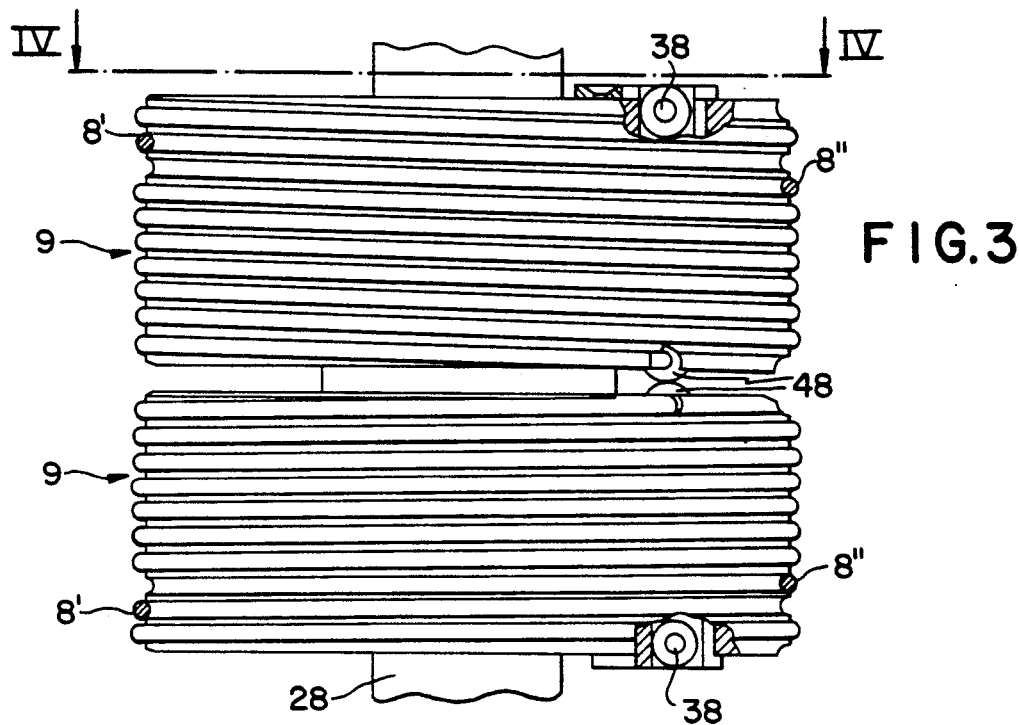
FIG. 3 is a part of an enlarged scale, schematic section along plane III—III of FIG. 4.
Figure 4:
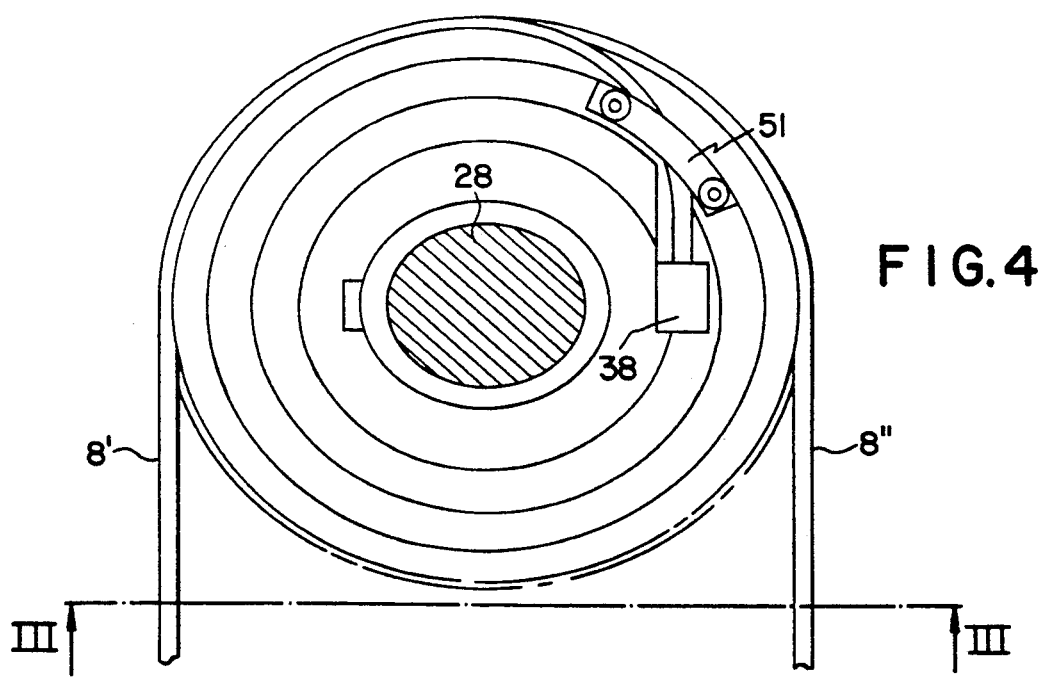
FIG. 4 is a schematic section along plane IV—IV of FIG. 3.

With reference to the drawings, 1 denotes a bed, in its entirety, provided uppermost with rectilinear ways 2 on which a mobile assembly denoted 3 is slidably mounted. The ways 2 are disposed parallel to a production line 4 carrying items fashioned in steel, or metal generally, in a continuous and uniform stream. The mobile assembly 3 comprises a power machine 5 the purpose of which is to effect an operation on each part-finished item of work 6 at a prescribed juncture, without interrupting the continuous movement of the work along the line 4. The mobile assembly 3 is supported by a frame 7 provided with guide elements that enable it to travel slidably along the ways 2 in one direction and the other. The movement of the mobile assembly 3 is delimited by two stops 24 and 25 mounted at the ends of the two rectilinear ways 2. The mobile assembly 3 is connected permanently to a pair of ropes 8, for example wire, disposed parallel with one another and looped tautly around relative pairs of pulleys 9 and 10, the degree of tautness being sufficient to ensure a suitable measure of grip between pulleys and rope; in the embodiment illustrated, the frame 7 is made fast to the top branch of each rope 8. Each individual rope 8 is physically divided into two branches 8' and 8", both of which are fixed at one end to the mobile assembly 3 and at the other to the pulley 9. The two ends of the two upper branches 8' of the ropes 8 are permanently connected by means of yokes 50 to the two ends of a lever 21, which is connected by means of a pivot 22 at its own center to a support 23 fixed to the frame 7 of the mobile assembly 3. The other end, indicated by 38, of each upper branch is fixed by a clamp 51 to its relative pulley 9. To this pulley 9, one of the two ends of the lower branch 8" is also fixed and is also partially wound, on its own thread, onto the same pulley 9. Partially wound areas A and B are shown in FIG. 2. Thus, the configuration is such that, with each rotation of the pulley 9 around its own axis, a winding (no unwinding) of a length of rope of the upper branch 8' is effected, exactly equal to the length of the lower branch 8", which itself, at the same time, unwinds from (or winds onto) the same pulley 9. As shown in FIG. 3, the pair of pulleys 9, mounted on the common shaft 28, are spaced from each other by abutting member 48. Each branch 8" also winds onto the freely rotating pulley 10 and has its own second end fixed to the lever 21 set on the opposite side of the mobile assembly 3 to that to which the upper branch 8' is permanently connected. The pulleys denoted 9 are coaxial, and mounted to a common shaft coupled directly to a geared motor 11, thus functioning as driving members. The pulleys 9 and geared motor 11 are mounted to an adjustable base 12 capable of movement at least in a direction parallel to the ways 2 and associated with the main bed 1 by way of a pair of hydraulic actuators 14. The hydraulic actuators 14 are fixed at one end to elements 27, which are themselves fixed on the bed 1, and at the other, to supports 26 which are firmly set on the movable base 12. The shaft 28 which carriers the pulleys 9 is rotatably supported on the supports 26. The remaining pulleys 10 are freely revolving and mounted to a fixed base 13. The purpose of the actuators 14 is to set and hold the ropes 8 at a prescribed tension, whilst the geared motor 11 serves to transmit drive to the mobile assembly 3 by way of the ropes 8, and to control its following movement. Not only does the type of drive adopted provide continuous control over and fine adjustment of the parameters governing movement of the assembly 3 carrying the tool, but with the ropes and pulleys remaining unaffected by wear that could jeopardize correct operation, a high level of dependability is also gained. Furthermore, any slack in the drive is taken up progressively during operation.

What is claimed:

1. A propulsion device for power machines or tools operating on continuous flow production lines, in particular as in the manufacture of iron and steel, comprising:
    a guided mobile assembly, to which the power tool is mounted, permanently attached to and set in motion by at least one rope or similar flexible component tensioned between and wound in adherent contact around two pulleys located respectively at the ends of the path traversed by the mobile assembly, and capable of traversing back and forth along a preestablished path disposed parallel to the production line;
    drive means designed to set at least one of said pulleys in rotation; and
    hydraulically operated means by which the branch of rope passing between the two pulleys is maintained at a prescribed tension,
    wherein two ends of two upper and lower branches of said rope are permanently connected in correspondence to two ends of a lever, which is connected by means of a pivot at its own center to a support fixed to the frame of the mobile assembly, the other end of each of said upper branches being fixed to its respective pulley, one of two ends of the respective lower branch, which is partially wound, on its own thread, onto the same pulley as the corresponding upper branch and which also winds onto a freely rotating pulley, being fixed on each of these pulleys and having its own second end fixed to the lever set on the opposite side of the mobile assembly to that to which the corresponding upper branch is permanently connected.

2. A device as in claim 1, wherein said respective pulley is mounted on a first base and driven by a geared motor, the other pulley being freely rotatable and mounted on a second base, wherein at least the first base is movable along said pre-established path, and tensioning means including at least one hydraulic actuator connected directly to said first base for applying tension to said first base.

* * * * *